(12) United States Patent
McChesney

(10) Patent No.: US 10,457,419 B2
(45) Date of Patent: *Oct. 29, 2019

(54) PIN ARRAY CHAMBER SYSTEMS AND METHODS FOR RELEASING AND CAPTURING A MOVING OBJECT—SPACE

(71) Applicant: Jeffrey Alan McChesney, Ridgefield, CT (US)

(72) Inventor: Jeffrey Alan McChesney, Ridgefield, CT (US)

( * ) Notice: Subject to any disclaimer, the term of this patent is extended or adjusted under 35 U.S.C. 154(b) by 302 days.

This patent is subject to a terminal disclaimer.

(21) Appl. No.: 15/672,032

(22) Filed: Aug. 8, 2017

(65) Prior Publication Data

US 2019/0047724 A1 Feb. 14, 2019

(51) Int. Cl.
*B64F 1/02* (2006.01)
*B64F 5/50* (2017.01)
*B64F 1/04* (2006.01)

(52) U.S. Cl.
CPC .............. *B64F 1/02* (2013.01); *B64F 1/04* (2013.01); *B64F 5/50* (2017.01); *B64C 2201/141* (2013.01); *B64C 2201/146* (2013.01); *B64C 2201/182* (2013.01)

(58) Field of Classification Search
CPC ............ B64G 1/1078; B64G 1/22; B64G 2001/1092; B64D 1/02; B64D 5/00; B64C 37/02; B64C 2201/182; B64F 1/02
USPC ..................... 114/322, 259, 50, 51; 294/86.4
See application file for complete search history.

(56) References Cited

U.S. PATENT DOCUMENTS

| | | | |
|---|---|---|---|
| 1,499,472 A | 7/1924 | Pratt | |
| 2,754,708 A | 7/1956 | Peterson | B25B 1/2421 269/224 |
| 2,939,657 A | 6/1960 | Westcott, Jr. | B64F 1/04 114/261 |
| 3,612,484 A | 10/1971 | Gallagher | B64F 5/0036 242/2 R |
| 4,536,980 A | 8/1985 | Fleming | |
| 4,572,564 A | 2/1986 | Cipolla | B25B 1/2421 269/266 |
| 5,011,207 A | 4/1991 | Stevens | B25J 15/106 294/119.1 |
| 5,054,717 A | 10/1991 | Taylor | |
| 5,407,185 A | 4/1995 | Zehnpfennig | B25B 1/2421 269/266 |
| 5,906,336 A | 5/1999 | Eckstein | |

(Continued)

FOREIGN PATENT DOCUMENTS

| | | | |
|---|---|---|---|
| EP | 1 370 461 A1 | 12/2003 | ........... B64C 39/024 |
| EP | 1 370 461 B1 | 9/2004 | |

(Continued)

*Primary Examiner* — Nicholas McFall
*Assistant Examiner* — Terri L Filosi

(57) ABSTRACT

A pin array release and capture chamber system includes a chamber assembly having two parallel plates of pin arrays from which a plurality of pins extends and retract vertically opposite each other so as to release and capture a space vehicle. The pin arrays are separated from each other by a space having two vertical and two horizontal sides, and the space is sized so as to receive the space vehicle. Each pin arrays may be housed in a pin array chamber enclosure. The chamber assembly may be attached to a moving object, such as a host space vessel.

9 Claims, 7 Drawing Sheets

(56) References Cited

U.S. PATENT DOCUMENTS

| | | |
|---|---|---|
| 6,298,587 B1 | 10/2001 | Vollom |
| 6,869,042 B2 | 3/2005 | Harrison |
| 7,143,976 B2 | 12/2006 | Snediker |
| 7,219,856 B2 | 5/2007 | Watts |
| 7,290,761 B2 | 11/2007 | Siegel .................... B25B 1/08 169/266 |
| 7,410,125 B2 | 8/2008 | Steele |
| 7,510,145 B2 | 3/2009 | Snediker |
| 7,798,445 B2 | 9/2010 | Heppe |
| 8,028,952 B2 | 10/2011 | Urnes |
| 8,038,090 B2 | 10/2011 | Wilson |
| 8,066,270 B2 | 11/2011 | Siegel .................. B25B 1/2421 269/266 |
| 8,276,844 B2 | 10/2012 | Kariv |
| 8,375,837 B2 | 2/2013 | Goossen |
| 8,439,301 B1 | 5/2013 | Lussier |
| 8,534,728 B1 | 9/2013 | Bosscher ............... B25J 15/106 269/266 |
| 8,567,718 B1 | 10/2013 | McDonnell |
| 9,650,156 B2 * | 5/2017 | McChesney .............. B64F 1/02 |
| 10,077,095 B1 * | 9/2018 | McChesney ............ B63B 27/36 |
| 10,243,415 B1 * | 3/2019 | Grundmann ............ H02J 50/90 |
| 2005/0186055 A1 | 8/2005 | Hyatt ...................... B64F 1/227 414/427 |
| 2013/0082137 A1 | 4/2013 | Gundlach |
| 2013/0341462 A1 | 12/2013 | Jacobs |
| 2014/0117147 A1 | 5/2014 | Hanna .................. B64C 31/024 244/2 |
| 2016/0011592 A1 | 1/2016 | Zhang .................. B64C 39/024 701/2 |
| 2016/0347192 A1 | 12/2016 | Lee ....................... B64C 39/024 |
| 2017/0021925 A1 * | 1/2017 | Weller ................... G06F 11/00 |

FOREIGN PATENT DOCUMENTS

| | | | |
|---|---|---|---|
| KR | 20160009446 A | 1/2016 | ........... B64C 39/024 |
| WO | WO02076826 A1 | 10/2002 | ........... B64C 39/024 |

* cited by examiner

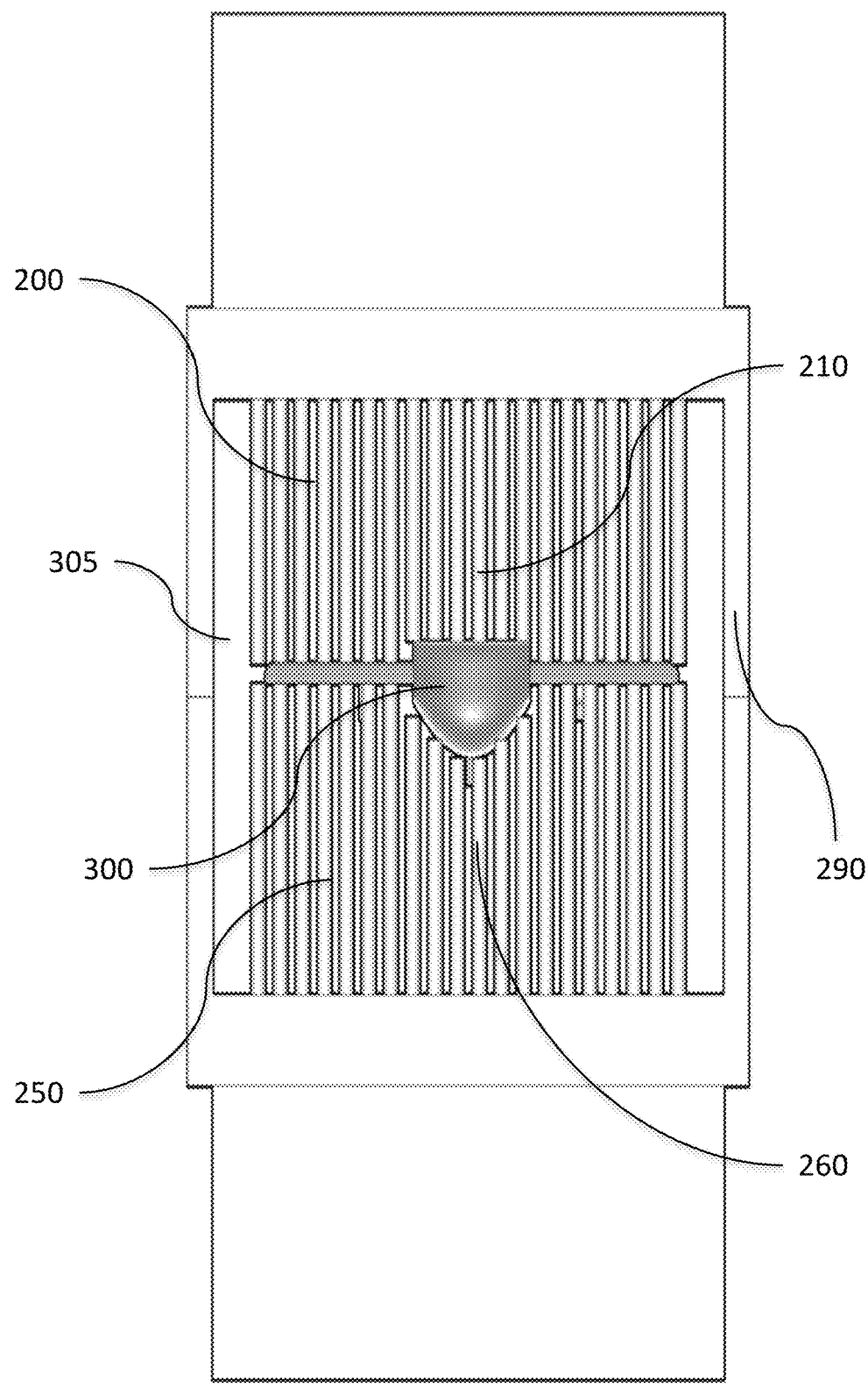
FIGURE 3 (Front View)

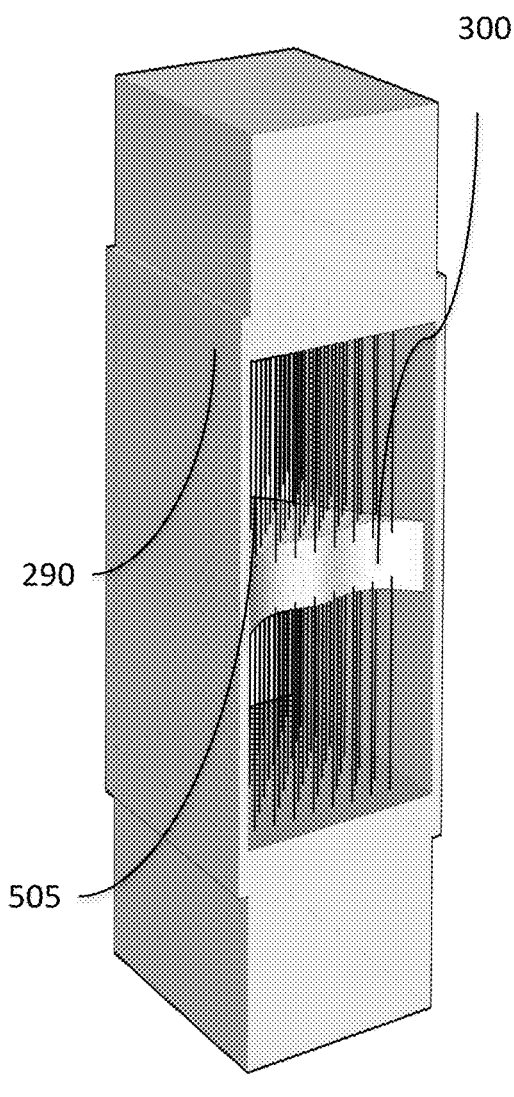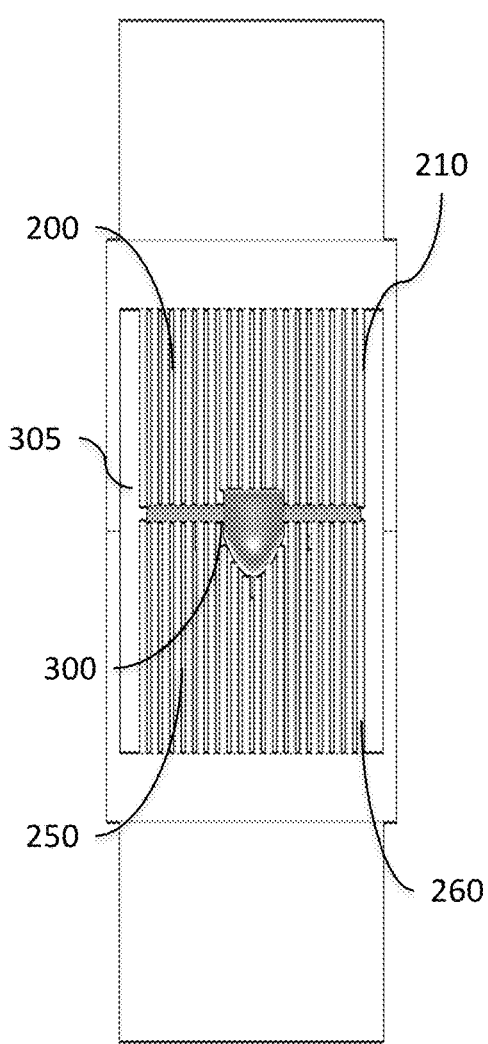
Aft View
FIGURE 6A
Front View
FIGURE 6B

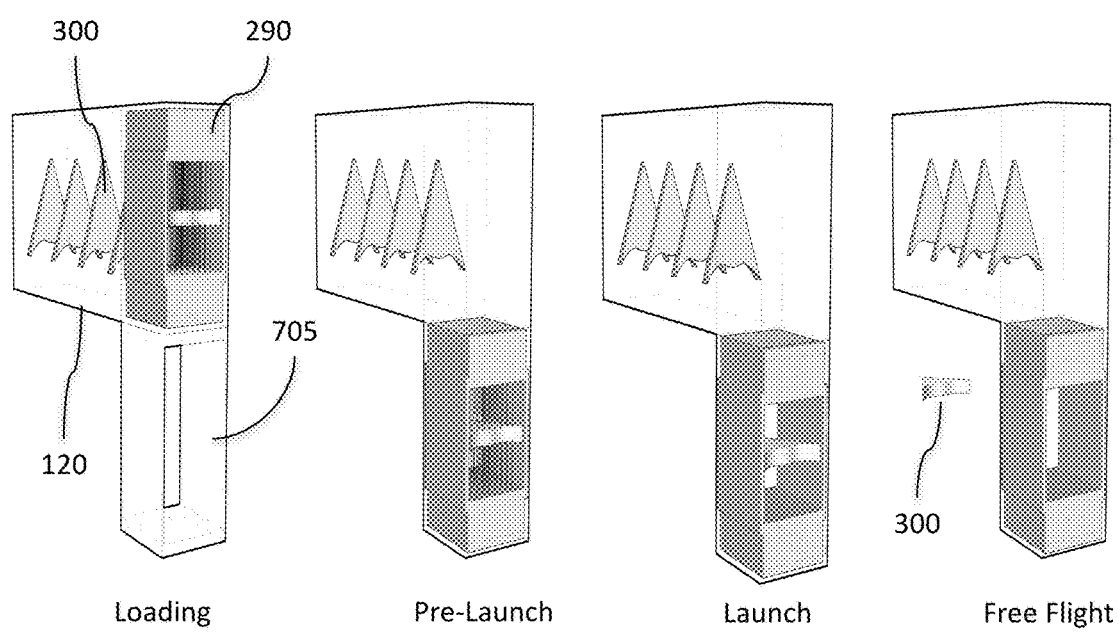
FIGURE 7A  Loading
FIGURE 7B  Pre-Launch
FIGURE 7C  Launch
FIGURE 7D  Free Flight

PIN ARRAY CHAMBER SYSTEMS AND METHODS FOR RELEASING AND CAPTURING A MOVING OBJECT—SPACE

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A COMPACT DISK OR AS TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

(1) Field of the Invention

Humans have used many release and arresting systems throughout history, to include nets for fishing, and snares for hunting, leading to harpoons, spears, ropes, and myriad other means to capture a desired moving object. Most prior art is concerned with capturing a moving object, with little regard to avoid harming the target, and even fewer contemplating later release as well. As reusable devices proliferated in the $19^{th}$, $20^{th}$ and $21^{st}$ centuries, the need for release systems increased ever so slightly. With the advent of autonomous moving objects, that are reusable, the need increased dramatically, with few precedent systems to solve very high-speed capture without destroying the moving object. Two subsets of moving objects, manned space vehicles (MSV) and unmanned space vehicles (USV), had initial technology focused on cumbersome, slow and very complex launch and recovery operations with a mother ship or host vessel, whether being remotely piloted or under autonomous control. With the advent of precision relative navigation allowing moving objects to align very accurately with a specific point in space relative to another object, non-destructive systems are increasingly useful for capturing and releasing moving objects. Space vehicles as a set include both MSVs and USVs.

(2) Description of Related Art Including Information Disclosed Under 37 CFR 1.97 and 1.98

Historical attempts for capture and release systems, for manned space vehicles and unmanned space vehicles fall into two categories of capture mechanisms. The first is a cooperative mechanism, such as a docking port with mutual clamps; while the second is a non-cooperative mechanism, such as a grappling hook or arm. Both have proven to be viable solutions, but at very high cost and risk. In addition, due to the inability to gracefully absorb the structural loads with prior solutions, many potential capture opportunities, such as satellite repairs, are not even pursued.

Launch and recovery solutions are largely constrained by these three factors: relative positioning navigation technology; timing of release and capture; and structural issues and weight, compounded in most cases by speed and inertial differentials and ensuing force loads between the space vehicle and the host vehicle.

While many attempts at launch and recovery of space vehicles with a host have been envisioned, few have proven practicable at overcoming the three constraints above, simultaneously and efficiently with high cycle rates. Discounting aerodynamic loads, aviation attempts at launch and recovery operations provide meaningful lessons for the state of the art. For example, the Fighter Conveyor (FICON) program in the late 1940s produced the XF-85 Goblin fighter aircraft for internal carriage to a B-36. This trapeze and hook system attempted to use a manned parasite fighter to overcome the three constraints above, as well as a fourth constraint, aerodynamic forces, which is unique to the air environment. Relative positioning was accomplished with a man in the loop, the timing of capture and release was solved by a trapeze and hook design, but the aerodynamic and structural issues were problematic. In fact, even after an inflight collision and redesign, the FICON program was cancelled because it caused more problems than it solved. The costs outweighed the benefits in the final analysis, even if safety could have been assured. The key problem identified in the FICON program, as well as other examples since, highlights the very real problems around recovery operations between two moving objects. Dramatic modifications and trade-offs to the aircraft and host have been required to achieve safe, repeatable, reliable recovery. Complexity, both in design and operational concepts, and untenable weight growth ensued. These complexity and weight considerations are even more pronounced in the space environment.

Space is defined as exoatmospheric to Earth, and in a virtual vacuum. As a result, even with the enormously complex astrodynamics and engineering mechanics of space-borne vehicles, the vacuum of space removes the drag and interference issues experienced with the air, and marine, environments. Regardless, due to the harshness of the space environment, the requirements for expensively engineered docking mechanisms, for both MSVs and USVs, to a host, such as the International Space Station, create limitations and restrict operations to only cooperative and co-engineered vehicles, and exclude non-cooperative vehicles, such as space junk and abandoned satellites. As a result, grappling arms and clamps have been used to capture and release some of these non-cooperative vehicles, with many of the same limitations and structural issues as air-based and maritime-based grappling arms.

BRIEF SUMMARY OF THE INVENTION

This disclosure focuses on a capture and release system using a pin array; thereby allowing graceful and non-destructive clamping of a moving object in a space environment. In particular, the system disclosed specifically solves the three constraints mentioned above in a novel and useful method. The Pin Array Chambering System (PACS) is generally agnostic to host platforms or the moving objects that need to be captured and released, as long as the moving object can be positioned between the pin arrays so that sufficient clamping force can be applied, without causing damage to either the host or the moving object.

BRIEF DESCRIPTION OF THE SEVERAL VIEWS OF THE DRAWING(S)

FIG. 3 depicts a space vehicle captured within the pin array chamber system

FIG. 6A and FIG. 6B depict two views of the pin array chamber system extending the pins with a clamping force to capture the space vehicle.

FIG. 7A-7D depict one embodiment of the PACS attached to a storage, feed and control mechanism 120, and depicts four sequential stages: Loading, Pre-Launch, Launch and Free Flight.

DETAILED DESCRIPTION OF THE INVENTION

The Pin Array Chambering System (PACS) uses known technology components combined into a new system and method, such as springs, pins and plates. In the described embodiment for space vehicle capture by another host vessel, to achieve high-volley rates for launch and recovery, PACS is in many ways analogous to rifles and Gatling guns, depending on which variations for the chambering and feed mechanisms are designed. In essence, PACS can consider each space vehicle as a round that needs to be fed, chambered and launched; but unlike a rifle, subsequently captured and reused.

Another aspect of the disclosure is its applicability with systems and methods for use in other gas and liquid mediums, including the vacuum of space. The PACS method can be used in the medium of air, on the surface of water, underwater, or anywhere in the vacuum of space across the entire universe, including all other gases and liquids, or mixtures thereof. Examples include, but are not limited to, releasing and capturing manned and unmanned vehicles by naval ships at rest and moving through water, above and below the surface; ground vehicles or stands at rest and moving across terrain, and space ships or vehicles moving through the vacuum of space, whether in orbit or not.

PACS benefits are numerous to the prior art. Due to its graceful release and capture, no major structural modifications to existing space vehicles are required. Other than structural tie-down points and power connections, relatively few modifications need to be made to existing host external designs, since PACS may be designed for attachment to the outside of existing vessels; thereby increasing PACS' utility. PACS can also be transferred between host vessels while in space, providing further utility over the prior art. PACS also provides high cycle rates for release and capture, enabling large volleys of space vehicles to be deployed. PACS is more reliable, repeatable, simple, flexible, scalable, programmable and efficient than other space vehicle capture systems.

Many specific details of certain embodiments of the disclosure are set forth in the following description and in FIGS. 1-7 to provide an informed understanding of the system and methods. Well known structures, systems and methods associated with such systems are not shown or described in detail to avoid unnecessarily obscuring this disclosure. As a result, those with ordinary skill in the disclosed art will infer that additional embodiments may be practiced without several of the details described below.

Figure 1A:
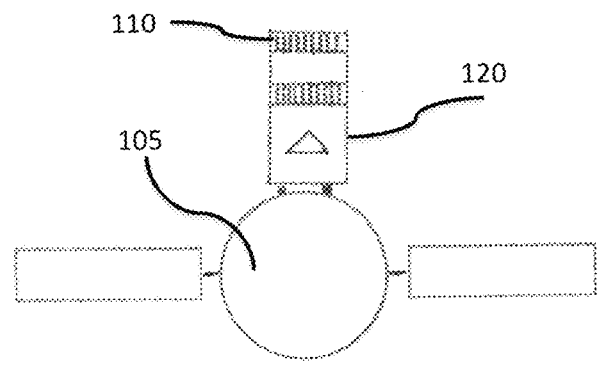
FIG. 1A-1C depict a space illustration from three different views as the host of a pin array system with the pin array chamber system open to the vacuum of space, in accordance with an embodiment of the disclosure.
Figure 1C:
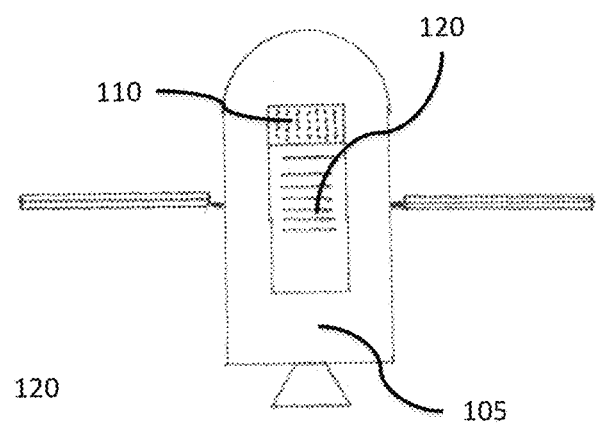
Figure 1B:
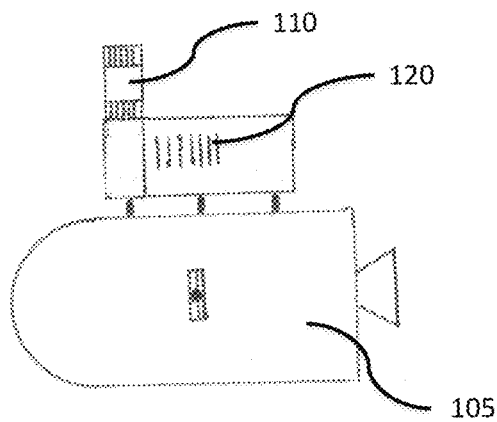

Embodiments of pin array chamber systems and methods for releasing and capturing moving Space Vehicles FIG. 1A-FIG. 1C depicts a space vessel illustration as the host of a pin array system with the pin array chamber system open to the vacuum of space for capture and release of a space vehicle. Vessel 105 is the host vessel with elements 110 as the pin arrays for one embodiment. In one embodiment, the PACS in element 110 is attached to a storage, feed and control mechanism 120, which allows for loading and unloading space vehicles into the pin array chamber system. Storage, feed and control mechanism 120 can be used with each PACS as another embodiment, allowing for conveyor handling of space vehicles; or as a centralized mechanism for multiple PACS.

Figure 2A:
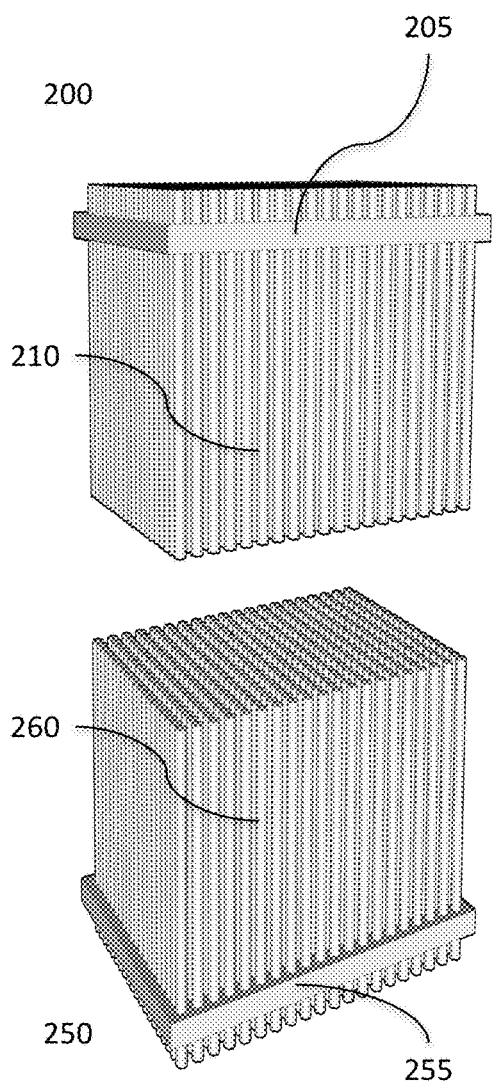
FIG. 2A depicts the pin arrays and FIG. 2B the pin array chamber system with multiple pins protruding from two opposing plates.
Figure 2B:
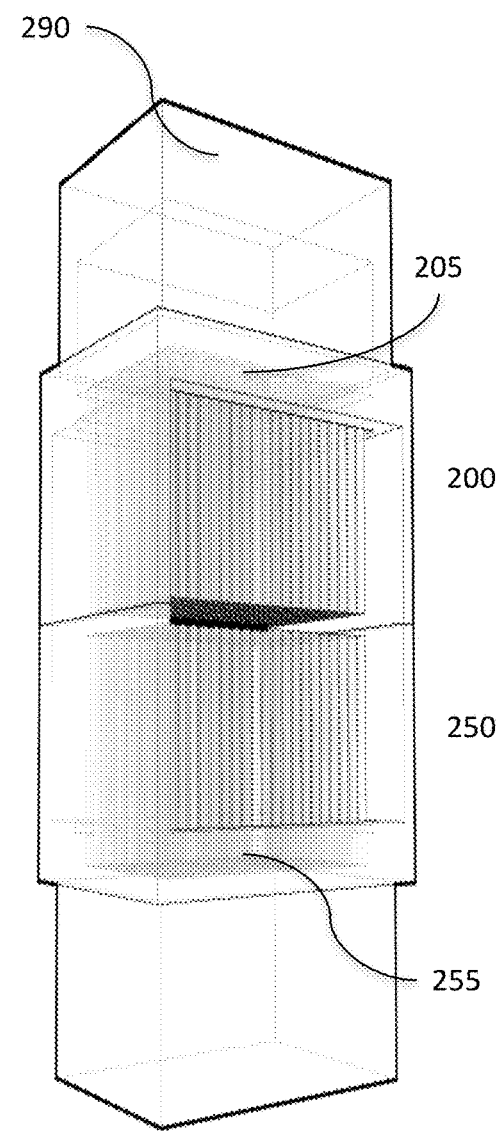

FIG. 2A and FIG. 2B depicts a pin array chamber mechanism, consisting of two opposing arrays 200 and 250, which are perpendicular to one another. Concerning array 200, holding plate 205 has one or more holes, of varying shapes, but depicted here as circular, allowing one or more pins 210 to extend and retract through plate 205. The thickness of plate 205 may vary, and there may be additional plates 205 along the longitudinal axis of the pin array, to provide additional stabilization and control of pins 210. In this embodiment, each pin 210 is of equal length, but may be of equal or varying lengths for other embodiments. Each pin 210 is extended or retracted through plate 205 by applying a longitudinal force comprising electro-mechanical, mechanical, spring, hydraulic or other means, which are not shown, but which one skilled in the relevant art can infer. This force can be applied, or not applied, to each pin 210 individually or equally to all pins 210 of array 200, if there is more than 1 pin. In the depicted embodiment, array 250 is an exact duplicate of array 200, including the force methods disclosed, but in an opposing orientation of 180 degrees, so that each pin 210 has an opposing pin 260. In other embodiments, the number, size, shape, force and alignment of opposing pins 260 of array 250 may be different, but they still apply an opposing force along the longitudinal axis of pins 260. An outer housing 290, of various materials and thickness, depicts one method for holding opposing array 200 and array 250 in position to one another. In this embodiment, pins from array 200 and 250 are retracted into a closed housing 290, above plate 205 and below plate 255. In another embodiment, the housing may only be the structural elements of the PACS, without any enclosure skin.

Pins 210 and 260 may be of varying materials, thickness and strength. In addition, pins 210 and 260 in this embodiment are uniform from end to end. In other embodiments, they may not be uniform and may include any material or combination of materials, such as rubber, rollers, or even ball-bearings as tips that will come in contact with the space vehicle or moving object. Other embodiments may include other tip materials and mechanisms to minimize damage upon contact with a moving object or to facilitate easier handling of the object once captured. An additional embodiment has telescoping pins, to allow for more compact storage into housing 290, when in the withdrawn position.

The opposing pins 210 and pins 260, of array 200 and array 250, respectively, apply opposing pin force in opposite longitudinal directions. In this embodiment, Plate 205 and plate 255 are separated at the combined extended length of pin 210 and pin 260, so that an object between them will displace the respective pins. As a result, the opposing forces of pins 210 and pins 260 provide a clamping motion of any object that is placed in between. Other embodiments may separate the two plates at greater or less than the combined extended length of the two pin arrays.

Another embodiment of the system and method may include a plurality of sets of pin array chambers in combination working along the same longitudinal axes as arrays 210 and 250, or other axes. As a further embodiment, another set of two pin arrays could operate 90 degrees rotated to a lateral axis from arrays 210 and 250; thereby creating a clamping force from four perpendicular directions into the same chamber space.

FIG. 3 depicts a space vehicle 300 within the pin array chamber system 305 from a front view. In this embodiment, the space vehicle is held in place by the clamping forces supplied in opposing directions from pins 210 and pins 260, from pin arrays 200 and 250, respectively. The pins 210 and pins 260 supply minimal forces individually so as not to harm the space vehicle, but a plurality of pins provide a sufficient clamping force to hold the space vehicle in position, even against any forces, being exerted on the space vehicle. As shown in FIG. 3, the extensions of pins 210 and pins 260 against the outer skin of the space vehicle creates an impression of pins that follows the contours of the space vehicle precisely. These pin contours provide additional resistance to any residual forces or motion. Each pin 210 and pin 260 is constructed of sufficient material, such as aluminum, so they are structurally held within plate 205 and 255, or a plurality of plates, not shown, without any substantial lateral deformation to the pins from the lateral forces. The net effect of extended pins 210 and pins 260 by pin array 200 and pin array 250 is a capture chamber that can conform to whatever shape comes between the arrays. In this embodiment, the PACS method allows innumerable space vehicle sizes and shapes to be captured between the pin arrays. Chamber 305 is the inside volume between plate 205, plate 255 and both sides of the enclosure 290. In this embodiment in the vacuum of space, since no gas or liquid medium exists, the considerations of drag and lateral flow of the slip-stream is moot, although the direction of travel into chamber 305 remains.

Figure 4:
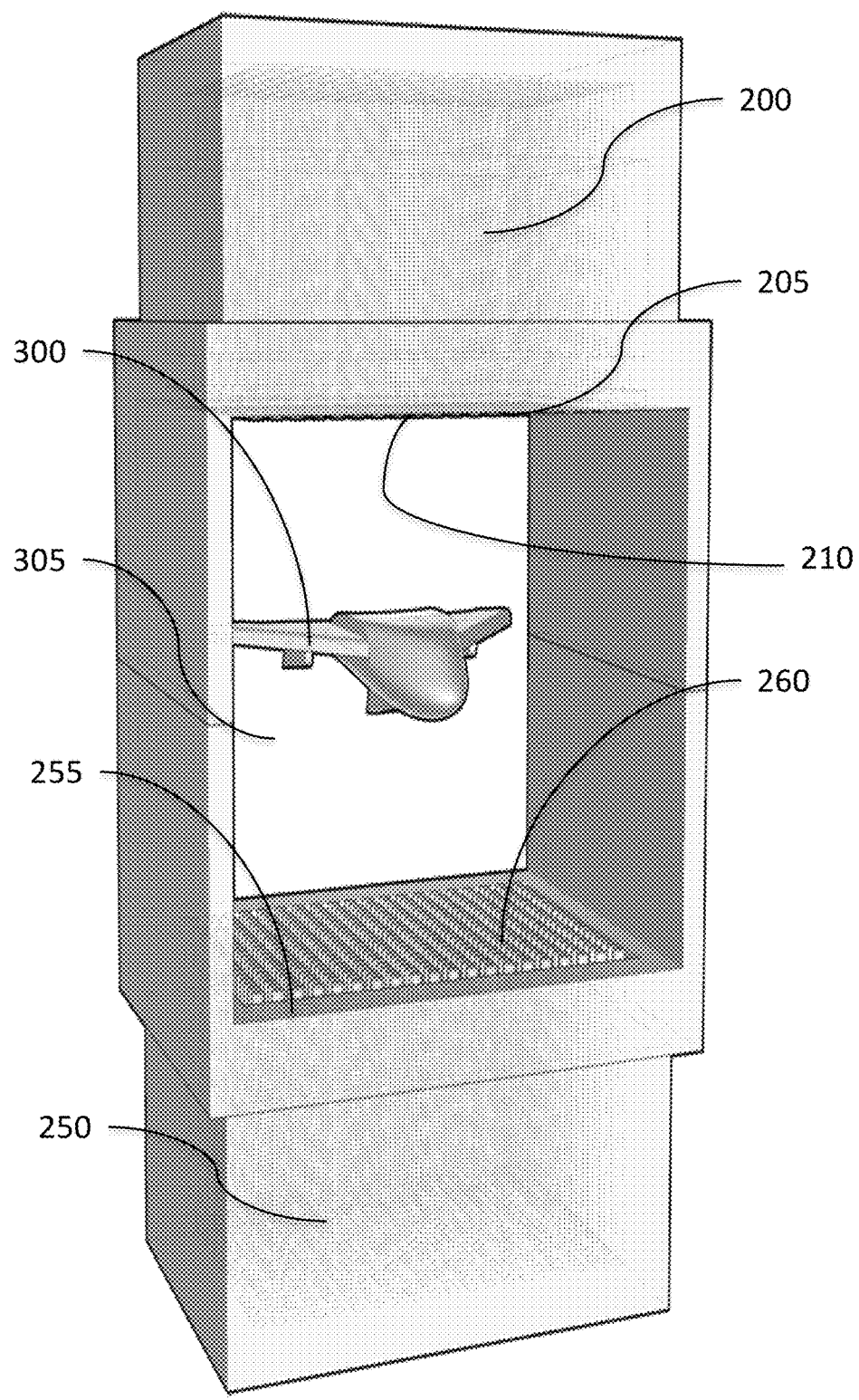
FIG. 4 depicts a space vehicle released, in free flight, positioned within the pin array chamber system

FIG. 4 depicts a space vehicle 300 being released, in free flight, positioned within the pin array chamber system 305. The pin array 200 and pin array 250 have retracted their pins 210 and pins 260, by reversing the longitudinal force along each pin, pulling each pin back through plate 205 and plate 255, respectively. In this embodiment, the space vehicle, at the time of pin retraction, maintains its precise relative position, under its own power, within chamber 305. Once the pins are retracted, the space vehicle is free to fly forward or in reverse to leave the PACS. In another embodiment, the space vehicle 300 may be unpowered or not powered enough to maintain precise relative position within chamber 305, and allowed to drift away.

Figure 5A:
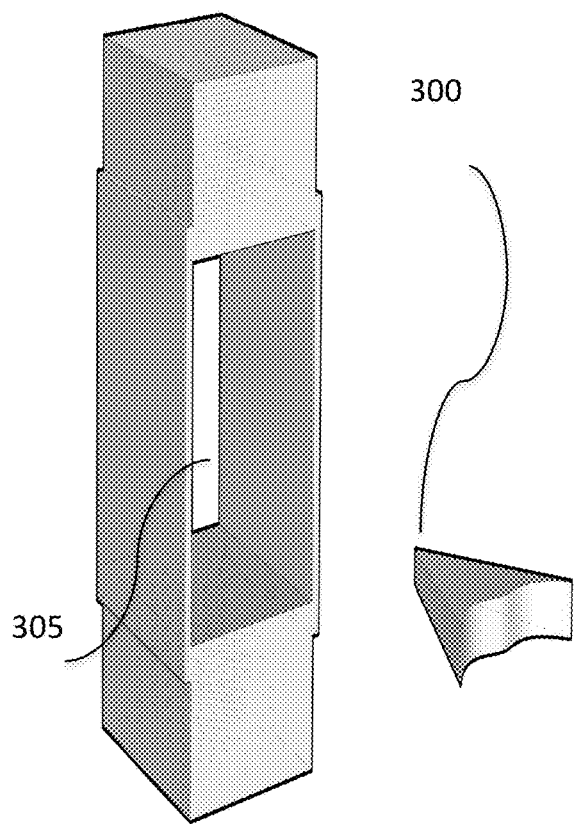
FIG. 5A depicts a free-flight space vehicle approaching the pin array chamber and FIG. 5B depicts the space vehicle stopping within the chamber.

FIG. 5A depicts a free-flight space vehicle 300, approaching the pin array chamber 305 and stopping within the chamber. The pins 210 and pins 260, not shown, are fully retracted by reverse longitudinal clamping forces previously mentioned, or in another embodiment, by the removal of those forces, such as spring tension. The pins depicted are by default in the retracted position. In other embodiments, a pin 210 or pin 260 may be extended to varying lengths before or as the space vehicle 300 approaches the chamber 305. In this embodiment, the space vehicle 300 uses autonomous precision relative navigation to move to a precise contact point 505 within the chamber 200. This precise contact point 505 is an optimal computed location, in three-dimensional space, for the space vehicle 300 to stop and be captured. In other embodiments, the moving object may be flown by a man onboard or remotely piloted.

Figure 5B:
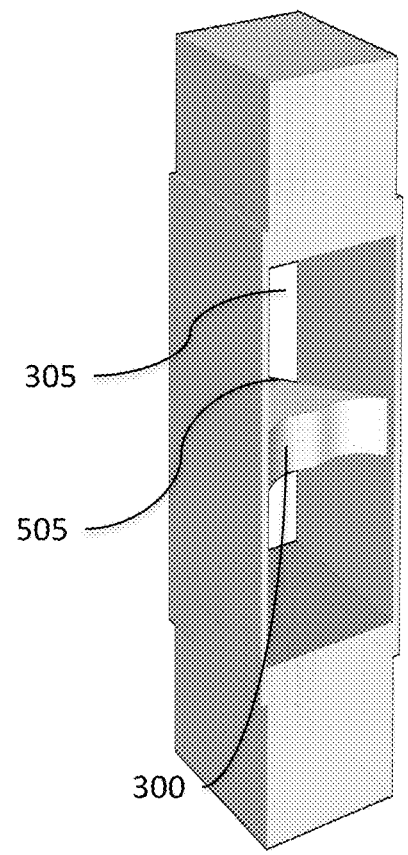

FIG. 5B depicts the pin array chamber system extending the pins 210 and pins 260 from opposing array 200 and array 250, with a clamping force to capture the space vehicle 300. In this embodiment, space vehicle 300 has stopped in a precise contact point 505 within the pin array chamber 305, matching the speed of the space vehicle 300 and the pin array chamber enclosure 290, which is attached to the host vessel. In other embodiments, the host may be stationary or at a different speed than the moving object, and the moving object is then captured. These latter embodiments may utilize a plurality of pin tips and materials to reduce the lateral forces to the pins and minimize forces and friction to the moving object. In yet another embodiment of a stationary host capturing a moving object, pin array 200 and pin array 250 may asynchronously extend pins 210 and pins 260 along the lateral direction of the moving object as it enters the pin array chamber 305. In that manner, the clamping motion is gracefully applied to the moving object as it decelerates without causing any undue harm to the moving object.

FIG. 7 depicts one embodiment of PACS attached to a storage, feed and control mechanism 120 previously disclosed in FIG. 1. The PACS is an integral part of a larger system to launch and recover multiple space vehicles 300. As shown, in the first stage Loading, space vehicle 300 is moved via storage, feed and control mechanism 120 to the PACS enclosure 290 and its various components previously mentioned in the previous Figures. As shown in FIG. 1, the storage, feed and control mechanism 120 has Launch chamber 705, shown in the open position. In the Pre-Launch stage, the space vehicle 300, within PACS enclosure 290, is then moved down into the Launch chamber 705 by various methods and mechanisms that one possessing ordinary skill in the relevant art can design. In the Launch stage, the space vehicle 300 is released from PACS by systems and methods previously disclosed. In the Free Flight stage, the space vehicle 300 moves away and the PACS is available for additional launch or recovery operations.

Additional Embodiments of Pin Array Chamber Systems and Methods for Releasing and Capturing Moving Objects In other embodiments, the space vehicle could be held in place by a plurality of pin arrays from a plurality of directions. In these cases, the pin arrays may have a plurality of distances between the opposing arrays at full pin extensions, and all pins would extend to their designed length unimpeded by other pins.

While the space environment outside of Earth's atmosphere is immense, it is not limitless. Over the last 60 years or so, mankind has abandoned large numbers of objects in space. Space debris, Space junk, Space waste, Space trash, or Space litter is the collection of defunct human-made objects in earth orbit, such as old satellites, spent rocket stages, and fragments from disintegration, erosion, and collisions—including those caused by the space debris itself.

To date, there have been five satellite collisions that have resulted in generating additional space waste. All of this is defined as space debris.

There are tens of thousands of artificial objects in orbit above the Earth, including approximately 1500 operational satellites. However, these are just objects large enough to be tracked. Experts estimate over 150 million objects orbiting the Earth, ranging from less than 1 cm in size. Collisions with debris have become a major hazard to space vehicles. Many of these objects are also orbiting with dangerous and extremely difficult velocities and inertia, including extreme tumbling and high rotation rates.

In another embodiment, the host space vessel uses an attached pin array chamber to capture and collect space junk into a collection pod. Since most of this space junk is unmanned and non-cooperative, and does not include a docking mechanism, the host space vessel carrying the pin array chamber can match velocity of any targeted space debris, and capture the debris while absorbing the rotational energy. As a result, this embodiment could capture multiple space debris and dispose of it en masse.

In another embodiment, the host space vessel uses an attached pin array chamber to capture natural heavenly bodies, such as, but not limited to, asteroids, ice, or comets. In particular, this embodiment could be used to mine heavenly bodies for materials, or as a defensive measure to impart acceleration or velocity changes to the heavenly body.

While the aforementioned embodiments disclose larger and visible systems and methods, additional embodiments occur at much smaller sizes, even well below what is visible to the naked eye, utilizing the same clamping force from a pin array. For those with ordinary skill in the relevant art, the pin array chamber system and method can be used down to the microscopic, molecular, and even atomic levels. At these sizes, pin array chamber clamping forces can also be used to capture moving objects, such as within a blood vessel for medicinal purposes, or as part of scientific research for capturing cells or specific molecules or atoms. Medicine, chemistry and physics, while not all inclusive of possible disciplines, are prime candidates for using PACS to diagnose and treat existing problems, for filtering operations or to conduct research.

I claim:

1. A pin array release and capture chamber system comprising:
   two substantially parallel plates of pin arrays,
   each pin array having a plurality of pins that extend and retract through the respective plate substantially perpendicular to the respective plate, the two pin arrays arranged vertically opposite each other with a space between the two pin arrays,
   wherein the pins of a first pin array of the two pin arrays and the pins of a second pin array of the two pin arrays extend toward each other in an extended state and retract away from each other in a retracted state, and
   wherein the space is enclosed by two vertical sides and two horizontal sides; and
   wherein the two pin arrays are sized such that in the extended state more than one of the pins of each pin array comes into contact with the body of a vehicle.

2. The pin array release and capture chamber system of claim 1, further comprising two pin array chamber enclosures, each pin array chamber enclosure associated with one of the two pin arrays and into which the pins of the associated pin array are retracted in the retracted state.

3. The pin array release and capture chamber system of claim 1, is attached to a moving object.

4. The pin array release and capture chamber system of claim 3, wherein the moving object is a space vessel.

5. The pin array release and capture chamber system of claim 1, is stationary with respect to the vehicle.

6. The pin array release and capture chamber system of claim 1, wherein the vehicle is manned.

7. The pin array release and capture chamber system of claim 1, wherein the vehicle is unmanned.

8. The pin array release and capture chamber system of claim 1, wherein the vehicle is space debris.

9. The pin array release and capture chamber system of claim 1, wherein the vehicle is an object in space.

* * * * *